US 6,626,277 B2

(12) United States Patent
Hauf

(10) Patent No.: US 6,626,277 B2
(45) Date of Patent: Sep. 30, 2003

(54) SYNCHRONIZER SLEEVE FOR A CHANGE SPEED GEAR AND METHOD OF MANUFACTURING SAME

(75) Inventor: Gerald Hauf, Ingelheim (DE)

(73) Assignee: Hay-Tec Automotive GmbH & Co. KG, Bad Sobernheim (DE)

( * ) Notice: Subject to any disclaimer, the term of this patent is extended or adjusted under 35 U.S.C. 154(b) by 0 days.

(21) Appl. No.: 09/841,998

(22) Filed: Apr. 26, 2001

(65) Prior Publication Data

US 2001/0035325 A1 Nov. 1, 2001

(30) Foreign Application Priority Data

Apr. 28, 2000 (DE) .......................... 100 21 088

(51) Int. Cl.⁷ .......................... F16D 13/00; F16D 23/02

(52) U.S. Cl. .................. 192/53.1; 192/53.364

(58) Field of Search .................. 192/53.1–53.364; 148/567, 570–573

(56) References Cited

U.S. PATENT DOCUMENTS

| | | | | |
|---|---|---|---|---|
| 4,373,973 A | * | 2/1983 | Cellitti et al. | 148/211 |
| 4,599,775 A | * | 7/1986 | Buscher | 29/893.33 |
| 4,672,729 A | * | 6/1987 | Hoguchi et al. | 29/893.34 |
| 4,700,446 A | * | 10/1987 | Schmid et al. | 29/893.34 |
| 4,742,723 A | * | 5/1988 | Lanzerath et al. | 74/339 |
| 4,773,248 A | * | 9/1988 | Yokoyama | 29/893.34 |
| 4,839,952 A | * | 6/1989 | Yokoyama | 29/558 |
| 5,096,037 A | * | 3/1992 | Knoess et al. | 192/108 |
| 5,267,636 A | * | 12/1993 | Fielding | 192/114 R |
| 5,302,215 A | * | 4/1994 | Pfaffmann | 148/567 |
| 5,531,305 A | * | 7/1996 | Roberts et al. | 192/53.332 |
| 5,582,281 A | * | 12/1996 | Nakashima et al. | 148/532 |
| 5,657,844 A | * | 8/1997 | Wagner | 192/53.32 |
| 5,701,574 A | * | 12/1997 | Derflinger et al. | 419/26 |
| 6,205,876 B1 | * | 3/2001 | Schwuger et al. | 74/339 |
| 6,276,180 B1 | * | 8/2001 | Hirschvogel et al. | 72/115 |

FOREIGN PATENT DOCUMENTS

| | | | | |
|---|---|---|---|---|
| DE | 39 08 989 C2 | 4/1993 | | |
| DE | 43 03 897 C1 | 3/1994 | | |
| JP | 62136523 A | * | 6/1987 | C21D/9/38 |
| JP | 63014816 A | * | 1/1988 | C21D/9/38 |

OTHER PUBLICATIONS

W. Johnson and J.B. Hawkyard, Forging: Recent Developments in Ring Rolling Applications and Rotary Forging, Metallurgia and Metal Forming, Jan. 1976, pp. 4–11.

Wolfgang Beitz and Karl–Heinrich Grote, Mechanische Konstruktionselemente—8 Zahnradgetriebe, pp. G125–G126, 1997, Springer–Verlag Berlin Heidelberg New York.

Hartmut Schrader and Klaus Buhler, Druck macht Spannung: Verfahren zum Umformen und Trennen beeinflussen die Randzonen von metallischen Werkstucken, Maschinenmarkt, Wurzburg 93 (1987) 52/53, Dec. 22, 1987, pp. 26–31.

Kurt Luck, Taschenbuch Maschinenbau, 1.2.5. Welle–Nabe–Veribindungen, pp. 46–49, 52, 1987, VEB Verlag Technik, Berlin.

* cited by examiner

*Primary Examiner*—Rodney H. Bonck
*Assistant Examiner*—David D. Le
(74) *Attorney, Agent, or Firm*—Lawrence E. Laubscher, Sr.

(57) ABSTRACT

The present invention refers to a synchronizer sleeve, and a method of manufacturing a synchronizer sleeve for a change speed gear. The synchronizer sleeve comprises in a known manner a shift fork recess opening towards the outer peripheral surface, and a tooth arrangement formed at its inner peripheral surface. The synchronizer sleeve according to the invention, which can be manufactured at a low price without affecting the wear to resistance, is characterized by a surface hardness of the shift-force recess, which is set by cold rolling, wherein the tooth arrangement is hardened locally, in particular it is hardened inductively. In the method of manufacturing the synchronizer sleeve according to the invention the shift fork recess is ready worked by cold rolling.

5 Claims, 1 Drawing Sheet

SYNCHRONIZER SLEEVE FOR A CHANGE SPEED GEAR AND METHOD OF MANUFACTURING SAME

BACKGROUND OF THE INVENTION

1. Field of the Invention

The present invention refers to a synchronizer sleeve for a change speed gear, which comprises a shift fork recess opening towards the outer peripheral surface of the synchronizer sleeve, and a tooth means formed at its inner peripheral surface.

2. Brief Description of the Prior Art

Synchronizer sleeves of this type are used in manual change speed gears. Then the synchronizer sleeve comprises at least one pressure surface which is regularly hardened and formed at the front end side of the synchronizer sleeve and which cooperates with a synchronizing ring for the frictional synchronization of the rotational speed. If synchronizer sleeves are used in electrically shifting gears in which the synchronization is carried out electronically, the formation of such a pressure surface at the front end side of the synchronizer sleeve can be renounced.

Synchronizer sleeves are usually manufactured from a blank generated by means of shaping, preferably by forging, said blank being fully turned on the lathe to manufacture the final contour of the ready synchronizer sleeve. On the inner peripheral surface of the synchronizer sleeve, a gear tooth arrangement is then broached or shaped in a conventional manner. Undercuts of this toothing are usually manufactured by rolling. Then details are milled. The component manufactured in this manner is then carburized.

In a manufacturing method of this type a certain surface hardness determined by the carburizing or nitriding process results on the entire component.

The carburizing of the synchronizer sleeve on the one hand involves the disadvantage that the component finished in its final contour must run through a relatively long hardening process. Moreover, a casting at the component may occur during the carburizing process so that the dimensional accuracy of the synchronizer sleeve is affected. Due to the instrumental and timely effort, the carburizing process is relatively expensive.

SUMMARY OF THE INVENTION

The object of the present invention is to provide a synchronizer sleeve, which without affecting the resistance to wear of the component, can be manufactured in a more inexpensive way. The object of the invention is furthermore to provide a method for the inexpensive manufacture of a synchronizer sleeve.

To solve this object, the synchronizer sleeve of the above-mentioned type is developed by the present invention in that the surface hardness of the shift fork recess is set by work-hardening, and that the tooth arrangement is locally hardened, in particular inductively hardened.

BRIEF DESCRIPTION OF THE DRAWING

Other objects and advantages of the invention will become apparent when the following description is viewed in the light of the accompanying drawing, in which.

DETAILED DESCRIPTION

Figure 1:
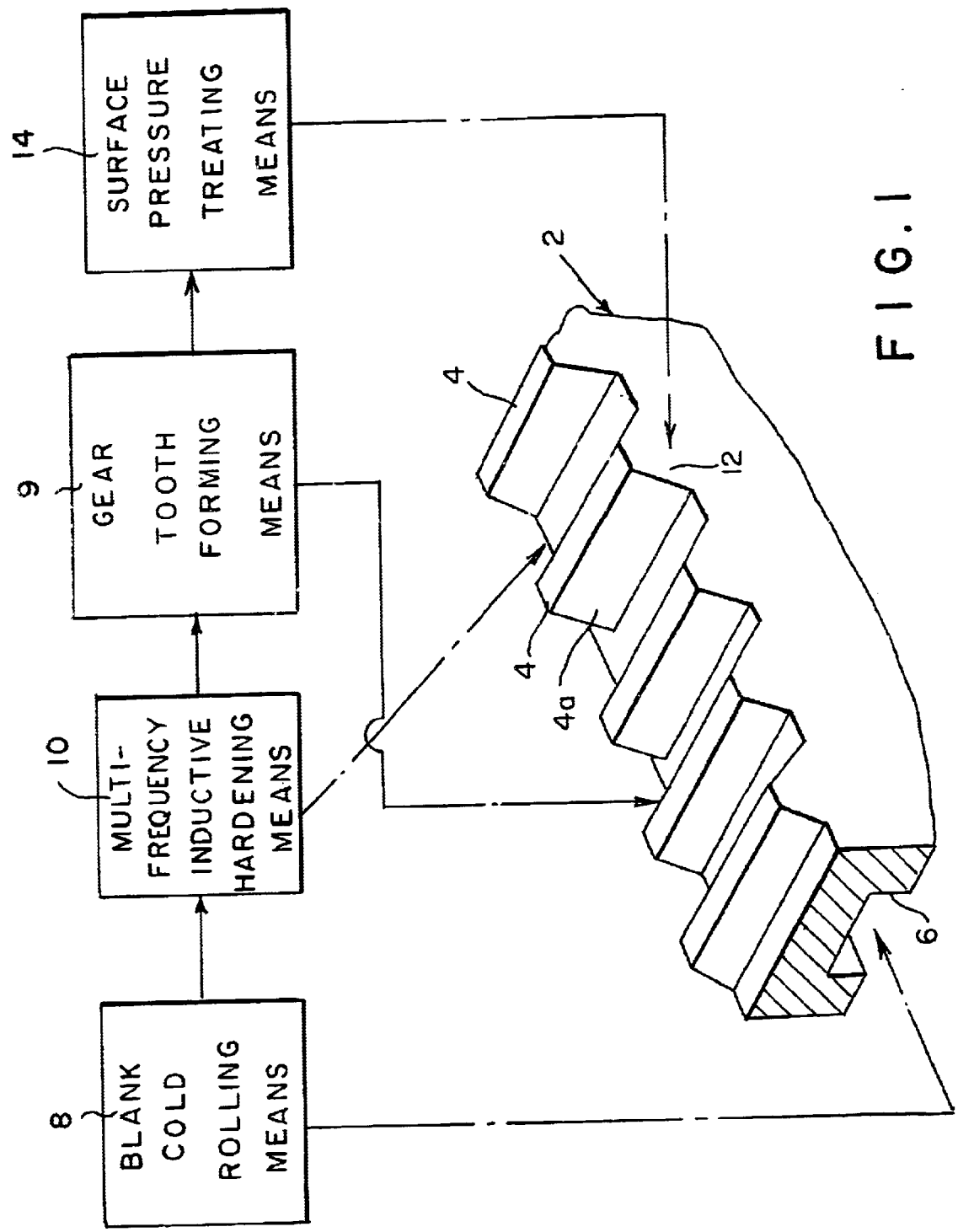
FIG. 1 is a schematic diagram illustrating the method of the present invention.

Referring now to the drawing, the synchronizer sleeve according to the present invention includes an annular body 2 that is formed by cold-rolling an annular metal blank by cold rolling means 8. This cold-rolling produces in the outer periphery of the body an annular shift fork recess 6 the surface of which is hardened during the cold-rolling process. A plurality of gear teeth 4 are then formed by machining or broaching the inner peripheral surface of the sleeve body 2 by gear tooth forming means 9. Thus the shift fork recess 6 is brought to its final contour when cold rolling the blank and is hardened at the same time. It evolved that in case of a suitable material selection for the synchronizer sleeve, the solidification of the surfaces by cold rolling in the area of the shift fork recess is sufficient to set a wear resistance of the synchronizer sleeve which is sufficient with respect to a sliding pad engaging into the shift fork recess. The surface of the shift fork recess in the synchronizer sleeve according to the invention is not additionally hardened by carburizing or nitriding. In the frictional combination shift force recess/sliding pad, the sliding pad is usually provided as the softer component, i.e., as a wear component of the frictional combination.

In the synchronizer sleeve according to the invention, the area of the gear teeth 4 is hardened locally only, preferably it is hardened inductively by inductive hardening means 10. Preferably an inductive hardening process is applied in frequency ranges, that are to be adapted to the respective application. An inductive hardening process by using different frequencies is also possible (multi-frequency curing). The adjustment of suitable parameters for the inductive hardening process are left to the expert's discretion and are to be adjusted in accordance with the respective material and the toothing geometry. When hardening the gear teeth area in particular the surfaces of the teeth are to be strengthened. By appropriately adapting the method parameters it is also possible to adjust the desired strength in the tooth root portion 4a of the individual teeth. The local hardening of the toothing offers the possibility to only increase the hardness of the surface of the teeth and to adjust the core portion of the teeth in the desired manner. A local hardening can be controlled more precisely compared to carburization. Moreover, it requires less time. A casting of the component is less dominant by the local heat effect than is for instance the case in carburization.

A preferred development of the synchronizer sleeve includes forming a pressure-treated surface area 12 at the end surface of the synchronizer sleeve adjacent the area of the teeth 4, use being made of surface pressure-treating means 14.

To solve the object with respect to the method, the priorly known method is developed in that a shift fork recess opening towards the peripheral surface of the synchronizer sleeve can be finished by cold rolling.

While in the known method the surface portion of the shift fork recess hardened by cold rolling was first of all worked in a machining manner and was then hardened in its final contour adjusted by a machining process, the finish work of the shift fork recess in the manufacturing method according to the invention is carried out by cold rolling. Further method steps are no longer required at least not at the outer peripheral surface. The toothing regularly formed at the inner peripheral surface may be formed by shrinking an annular gear. A toothing at the cold-rolled component can also be formed in a directly chip-removing manner and can be subsequently locally hardened.

When manufacturing a synchronizer sleeve 2 for a manual change speed gear, the pressure-treated surface 12 preferably formed at the end surface of the synchronizer sleeve is formed during the local hardening process of the toothing. The pressure-treated surface 12 is formed preferably directly at the inner peripheral surface of the synchronizer sleeve so that the local hardening of the toothing at the inner peripheral surface of the synchronizer sleeve also leads to an increase of the hardness in a partial section of the annular surfaces of the synchronizer sleeve.

What is claimed is:

1. A method of manufacturing a synchronizer sleeve for a change speed gear, comprising:
   (a) cold rolling a unitary annular metal blank (2) to produce in the outer peripheral surface thereof an annular shift fork recess (6), thereby to obtain a final degree of surface hardness of said shift fork recess;
   (b) subsequently forming a plurality of gear teeth (4) in the inner peripheral portion of said cold-rolled blank; and
   (c) locally hardening said gear tooth inner peripheral portion.

2. A synchronizer sleeve produced by the process of claim 1.

3. A method as defined in claim 1, wherein said blank gear tooth inner peripheral portion is locally hardened inductively.

4. A method as defined in claim 3, wherein said blank inner gear tooth portion is hardened inductively by means of multi-frequency inductive hardening.

5. A method as defined in claim 3, and further including the step of pressure treating the end surfaces (12) of said body adjacent said gear tooth inner peripheral portion.

* * * * *